United States Patent [19]

Fritz

[11] Patent Number: 4,895,551
[45] Date of Patent: Jan. 23, 1990

[54] DYNAMICALLY BALANCED DRIVE SHAFT

[75] Inventor: Peter J. Fritz, Mequon, Wis.

[73] Assignee: A. O. Smith Corporation, Milwaukee, Wis.

[21] Appl. No.: 100,545

[22] Filed: Sep. 24, 1987

[51] Int. Cl.$^4$ ............................ F16C 3/02; F16F 15/32
[52] U.S. Cl. ....................................... 464/180; 464/181
[58] Field of Search ............... 29/402.09, 526 A; 73/468; 74/573 R; 464/179, 180, 181, 183, 185

[56] References Cited

U.S. PATENT DOCUMENTS 3,783,522  1/1974  Dodd ..................................... 33/181
4,170,896  10/1979  Korkosz ............................ 73/468 X

FOREIGN PATENT DOCUMENTS 110942  6/1984  Japan ................................. 74/573 R
2041159  9/1980  United Kingdom ................ 464/180
2119063  11/1983  United Kingdom ................ 464/180

Primary Examiner—Daniel P. Stodola
Attorney, Agent, or Firm—Andrus, Sceales, Starke & Sawall

[57] ABSTRACT

A dynamically balanced drive shaft. The shaft is preferably formed of fiber reinforced resin and is designed to operate at speeds below the first critical speed. To balance the shaft, a mass or patch of resin containing high density particles, such as metal particles, is applied to one or more locations on the shaft. The patch extends only a portion of the circumference of the shaft and generally has an area less than 10 sq. inches, and generally has a thickness less than 1/16th inch.

10 Claims, 1 Drawing Sheet

DYNAMICALLY BALANCED DRIVE SHAFT

BACKGROUND OF THE INVENTION

In commercial production, drive shafts, such as vehicle drive shafts, are not uniformly round in cross-section, and are not absolutely straight throughout their length. In addition, each shaft has deviations in wall thickness. Such inhomogeneities in geometry and material result in incongruent mass and rotation centers, resulting in eccentric loading imbalance. This imbalance can cause excessive bearing loads during service, and the bearing loads are aggravated by consequent whirling or whipping of the shaft caused by this unbalanced mass distribution.

With steel shafts, the practice has been to balance the shaft by welding small weights at the end of the shaft. The small balance weights must be attached to the yoke sleeve area at the ends of the drive shaft, because welding of the weights to the thin wall tube can cause thermally induced distortions, resulting in bowing of the shaft that causes an additional imbalance.

With composite drive shafts, such as those formed of fiber reinforced resin, weights cannot be welded to the shaft and thus the shaft must be balanced by other means.

U.S. Pat. No. 4,170,896 describes a method of balancing a high speed propeller shaft through use of self-adhering aluminum tape. In accordance with the procedure described in that patent, the imbalance is measured at a multiplicity of stations along the length of the shaft and the aluminum tape is applied as a continuous strip in a generally zig-zag pattern along the length of the shaft to balance the shaft.

SUMMARY OF THE INVENTION

The invention is directed to a dynamically balanced drive shaft assembly and to a method of producing the same. The shaft, which can be composed of either metal or composite materials, is designed in general for operation below the first critical speed. In accordance with the invention, a mass or patch of resin containing high density particles, such as metal particles, is bonded to one or more spaced locations, called balancing planes, on the shaft to dynamically balance the shaft.

The balancing mass is applied to the shaft in the form of a relatively thick paste or slurry, and after curing or cooling of the resin, the mass will firmly bond to the shaft.

In practice, the mass or patch has a thickness less than 1/16th inch, and covers an area less than 10 sq. inches, and has a composite density in the range of 0.1 to 0.3 lbs. per cu. inch, corresponding to an areal density of 0.08 to 0.24 oz. per sq. inch for a thickness of 1/20th inch.

The resin slurry or paste can be directly dispensed onto the shaft in a precisely metered quantity and the slurry can be positioned at any plane of balancing.

As the resin mass or patch has a relatively large cross-sectional area and a minimum thickness, stress concentrations in the area of the weighted patch are minimized for the bonding area is greatly increased over systems employing welded weights.

As a further advantage, the weighted patch of the invention has substantially less thickness than welded weights as used in the past, which thereby reduces the radial clearance required for operation of the drive shaft.

By utilizing the method of the invention with steel or metal drive shafts, the welding of metal weights to the shaft is eliminated, with the result that expensive welding equipment is not required. Moreover, heat distortion resulting from welding, which can cause bowing of the shaft, is eliminated.

The curing of the thermosetting resin matrix can be initiated by the use of catalysts, ultraviolet light, infrared heat, or other energy sources. After the patch is cured, the audit cycle of balancing can be run to measure the residual imbalance after the patch is applied. If the shaft is not within balance specifications, the patch can be scraped, or removed, or resin slurry added to the shaft to provide the proper balance. If a highly viscous slurry is used, the audit cycle can be performed before the patch is cured, and adjustments made by resin slurry addition or removal as necessary. With a thermoplastic resin matrix, the slurry can be heated and scraped, or added as necessary.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
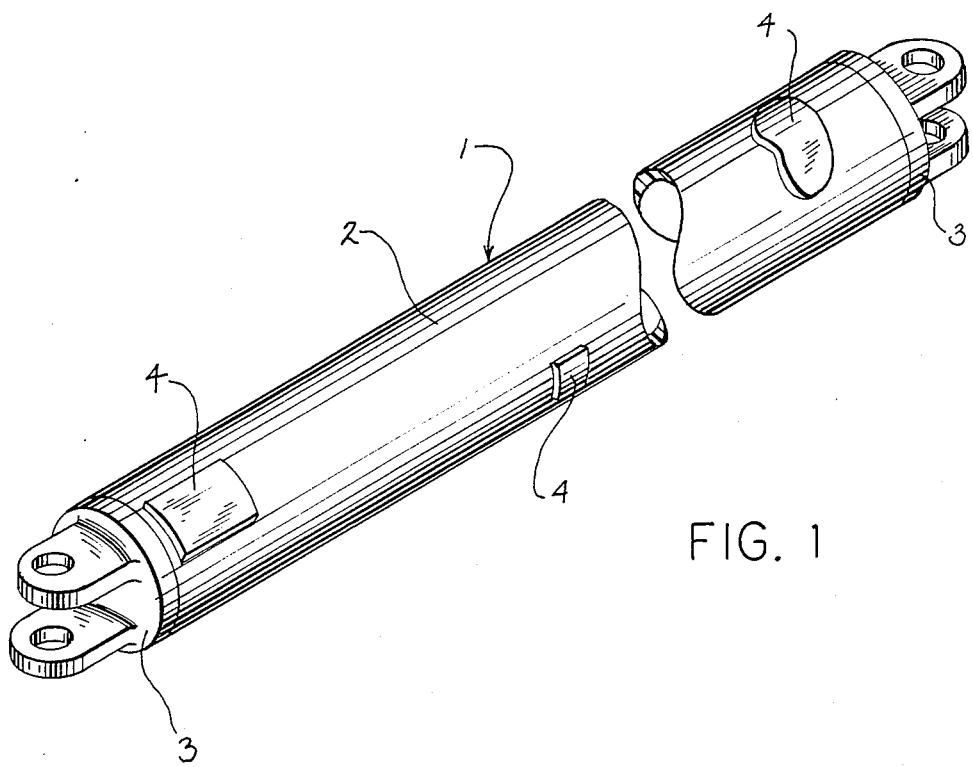
FIG. 1 is a perspective view of a drive shaft incorporating the weighted patches of the invention.
Figure 2:
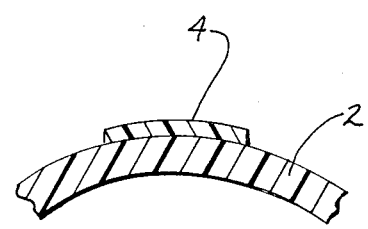
FIG. 2 is an enlarged fragmentary transverse section of the drive shaft of FIG. 1 showing the attachment of the patch to the shaft.

FIG. 1 shows a drive shaft assembly 1, composed of a shaft 2 and end yokes 3, which has been balanced through the application of a plurality of high density patches or masses 4 to shaft 2. The invention has particular application to a vehicle drive shaft having a length in the range of about 4 ft. to 8 ft. and which is adapted to operate at speeds below the first critical speed. In general, such a shaft will operate at speeds below 6,000 rpm and generally in the range of 0 to 3,000 rpm.

Shaft 2, as illustrated, can be formed of a composite material, such as fiber reinforced resin, or alternately shaft 2 can be composed of metal such as steel, or combinations of metal and composite. The shaft can either be tubular or solid.

The fiber reinforced resin shaft 2 is generally formed of substantially continuous fibers of a material, such as glass or graphite, which are wound in a number of superimposed layers to form the shaft. Various winding patterns can be employed, as is conventional, with the fibers being disposed at any desired helix angle.

In a composite shaft, the fibrous material is bonded by a thermosetting resin, such as an epoxy or polyester resin, or by a thermoplastic resin.

The balancing patches 4 are formed of a matrix of a material which will adhere to shaft 2, such as a resin, and containing finely divided particles of a high-density material.

More specifically, the matrix of patch 4 can consist of a thermosetting resin, or a thermoplastic resin. The thermosetting resin can take the form of such as an epoxy, polyester, or isocyanurate resin, or other resin carrier which will bond to the shaft 2. The thermosetting resin can be cured by catalyst, ultraviolet light, infrared light, or other energy source. The resin can be cured at room temperature or at an elevated temperature. The thermoplastic resin can take the form of a structural hot melt type, such as a polyamid or thermoplastic polyester resin.

The high density particles preferably are metal particles, such as steel, in the form of powder, filings, shot, or the like, and generally are smaller than 200 mesh. The high density particles preferably have a density greater than 0.25 lbs. per cu. inch.

Each patch 4, in general, is composed of from 25 to 75% of the matrix, with the balance being the high density particles. The resulting patch, including the matrix and the high-density particles, has a composite density in the range of 0.1 to 0.3 lbs. per cu. inch corresponding to an areal density of 0.8 to 0.24 oz. per sq. inch for a thickness of 1/20th inch.

The patch or mass 4, in general, has a thickness less than 1/16th inch, which is substantially less than the thickness of welded weights which are commonly used. The reduced thickness reduces the radial clearance for the drive shaft, which is a substantial advantage when dealing with automotive drive shafts.

Each patch 4 extends over only a portion of the circumference and length of shaft 1 and, normally has an area from 1 to 10 sq inches.

In certain instances, the patches 4 may be applied only to one or both ends of the shaft 2, while in other instances, as shown in FIG. 1, the patches 4 are not only applied to the ends of the shaft but a patch is also applied to the central portion of the shaft.

The high-density particles serve primarily as the balancing weight while the resin matrix serves as both the carrier during processing and as the bonding agent to the shaft.

In the balancing procedure, the shaft assembly 1, including shaft 2 and attached yokes 3, is initially rotated on a balancing machine in a conventional manner to determine the locations of imbalance. The areas to which the patches or masses 4 are to be applied are then cleaned with a suitable solvent, and when using a thermosetting resin as the matrix, a quantity of the liquid uncured resin slurry or paste is applied to the shaft by a spatula or spraying. Alternately, the uncured resin in a semi-solid condition can be applied as a layer to a release sheet and the sheet can then be cut into the appropriate size.

After the slurry or paste is applied to the shaft, the shaft can be cured at room temperature, or the shaft can be heated to a temperature generally in the range of 150° F. to 300° F. to accelerate the cure of the thermosetting resin. Heating can be carried out by blowing hot air through the hollow drive shaft or placing the shaft in an oven, or using other conventional heating mechanism. If metal particles are used as the high density particles, induction heating can be employed to accelerate the cure.

When using a thermoplastic resin, the resin is heated to melt the resin and the high density particles are added to the molten resin. After application of the liquid resin to the shaft, the resin is cooled to solidify the patch.

Before or after the patches 4 have cured or solidified and bonded to shaft 2, the balance of the shaft can be audited by spinning the shaft on the balancing machine. If it is found that the shaft is not properly balanced, portions of the patches 4 can be scraped or removed, or additional slurry can be applied to the shaft to achieve the desired balancing.

Through use of the invention, both metal and composite drive shafts can be accurately balanced. The method eliminates the expensive welding equipment required in the past for shaft balancing and also eliminates the possibility of heat distortion of the shaft that can result when welding is employed.

As the patches 4 have a relatively large surface area, stress concentrations around the weighted area are minimized.

As the patch or mass 4 normally extends over a substantial circumferential distance, the radius from the shaft axis to the patch centroid is slightly less than the shaft radius. In practice, a rectangular patch that extends three inches along the circumference of a 4 inch diameter shaft has a centroidal radius of 1.8 inches, which is 10 percent less than in the shaft radius.

Figure 3:
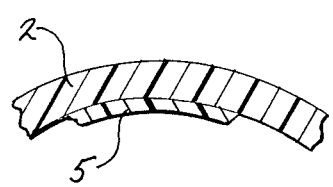
FIG. 3 is a fragmentary transverse section of a modified form of the invention in which the weighted patch is applied to the interior surface of the shaft.

FIG. 3 shows a modified form of the invention, in which a mass or patch 5 of the matrix material containing the high density particles is applied to the inside surface of the shaft 2. The resin slurry can be applied to the interior surface of the shaft by an extended spray gun nozzle. The application of the weighted patches to the interior of the pipe does not increase the outer diameter of the shaft 2 and does not detract from the appearance of the shaft.

While the above description has shown the invention as applied to a tubular drive shaft, it is contemplated that the invention can also be used with a solid shaft, or other shaft geometry. One or more weighted patches can be applied along the length of the shaft, as required to achieve the balance.

Similarly, while the invention has been described in conjunction with a vehicle drive shaft, it is apparent that the invention can also be employed to dynamically balance other types of shafts.

Various modes of carrying out the invention are contemplated as being within the scope of the following claims particularly pointing out and distinctly claiming the subject matter which is regarded as the invention.

I claim:

1. A balanced shaft assembly, comprising a shaft, and at least one patch applied to said shaft, said patch comprising a matrix of resin bonded to the shaft and extending only a portion of the circumference and axial length of said shaft, said patch having a thickness less than 1/16 inch, said particles comprising from 25% to 75% by weight of said patch, said patch having a relatively large surface area in comparison with said thickness whereby stress concentrations around the patch are minimized.

2. The assembly of claim 1, and including a pair of patches, each patch disposed adjacent an end of said shaft.

3. the assembly of claim 2, and including a third patch disposed between said pair of patches adjacent the center of said shaft.

4. The assembly of claim 1, wherein said patch has a composite density in the range of 0.1 to 0.3 lbs per cu. inch.

5. The assembly of claim 1, wherein said particles are metal and said matrix is selected from the group consisting of a cured thermosetting resin and a thermoplastic resin.

6. The assembly of claim 1, wherein said shaft is composed of fiber reinforced resin.

7. A balanced shaft assembly comprising a fiber reinforced resin tubular shaft, at least one mass applied to the shaft at a location to dynamically balance the shaft, said mass including a matrix of a substance capable of adhering to said shaft and containing a multiplicity of finely divided high density particles having a density greater than 0.25 lbs. per cu. inch, said mass having a thickness less than 1/16 inch, said particles comprise from 25% to 75% by weight of said patch, said mass having a relatively large surface area in comparison with said thickness whereby stress concentrations around the mass are minimized.

8. The assembly of claim 7, wherein said particles are composed of metal and said matrix is selected from the group consisting of a thermosetting resin and a thermoplastic resin.

9. The assembly of claim 8, wherein said metal is iron and said thermosetting resin is an epoxy resin.

10. The assembly of claim 7, wherein said particles have a size less than 200 mesh.

* * * * *

UNITED STATES PATENT AND TRADEMARK OFFICE
CERTIFICATE OF CORRECTION

PATENT NO. : 4,895,551

DATED : January 23, 1990

INVENTOR(S) : PETER J. FRITZ

It is certified that error appears in the above-identified patent and that said Letters Patent is hereby corrected as shown below:

Col. 4, Line 45, CLAIM 1, After "resin" insert ---containing finely divided high density particles, said patch being---;

Col. 4, Line 57, CLAIM 3, Delete "the" and substitute therefor ---The---

Signed and Sealed this

Twentieth Day of August, 1991

*Attest:*

HARRY F. MANBECK, JR.

*Attesting Officer*   *Commissioner of Patents and Trademarks*